United States Patent
Wesseltoft

[19]

[11] Patent Number: 5,887,119
[45] Date of Patent: Mar. 23, 1999

[54] CEILING MOUNTED ELECTRICAL HEATER WITH FLEXIBLE MOUNTING STRUCTURE

[76] Inventor: Per Wesseltoft, Ekornfaret 6, N-3060 Svelvik, Norway

[21] Appl. No.: 860,910

[22] PCT Filed: Jan. 12, 1996

[86] PCT No.: PCT/NO96/00007

§ 371 Date: Jul. 11, 1997

§ 102(e) Date: Jul. 11, 1997

[87] PCT Pub. No.: WO96/21828

PCT Pub. Date: Jul. 18, 1996

[30] Foreign Application Priority Data

Jan. 13, 1995 [NO] Norway ..................................... 950130

[51] Int. Cl.⁶ ..................................................... F24D 13/02
[52] U.S. Cl. ........................... 392/436; 338/316; 219/526
[58] Field of Search ..................................... 392/432–439; 219/526, 532; 338/316

[56] References Cited

U.S. PATENT DOCUMENTS

| | | | |
|---|---|---|---|
| 1,849,595 | 3/1932 | Shaw | 338/316 |
| 1,873,053 | 9/1948 | Shaw | 338/319 |
| 2,448,617 | 8/1932 | Owens | 338/316 |
| 2,525,850 | 10/1950 | Andersen . | |
| 3,032,638 | 5/1962 | Hall . | |
| 3,603,764 | 9/1971 | Martin . | |
| 3,684,859 | 8/1972 | Desloge . | |
| 4,010,348 | 3/1977 | Salinger . | |
| 4,677,279 | 6/1987 | Wesseltoft . | |
| 4,788,414 | 11/1988 | Schreder | 219/464 |

FOREIGN PATENT DOCUMENTS

| | | | |
|---|---|---|---|
| 2 323 105 | 1/1977 | France . | |
| 2 437 759 | 4/1980 | France . | |
| 39 14 897 | 8/1990 | Germany . | |
| 155790 | 2/1987 | Norway . | |
| 995089 | 6/1965 | United Kingdom | 338/316 |
| 89/026565 | 3/1989 | WIPO . | |

*Primary Examiner*—John A. Jeffery
*Attorney, Agent, or Firm*—Barry R. Lipsitz; Ralph F. Hoppin

[57] ABSTRACT

An electric heater for ceilings which emits radiant heat includes a radiant plate having heating elements which radiate in a downward direction. The radiant plate is mounted to a top part by a number of elastic/flexible brackets, including pivotable and non-pivotable brackets. The brackets allow the radiant plate to move laterally outward in a horizontal plane when the radiant plate is heated to prevent twisting or other deformation of the radiant plate. The pivotable brackets are mounted near the ends of the heater on all four sides to accommodate expansion of the radiant plate in a horizontal plane. The non-pivotable brackets are mounted at the midpoints of the ends of the heater.

7 Claims, 3 Drawing Sheets

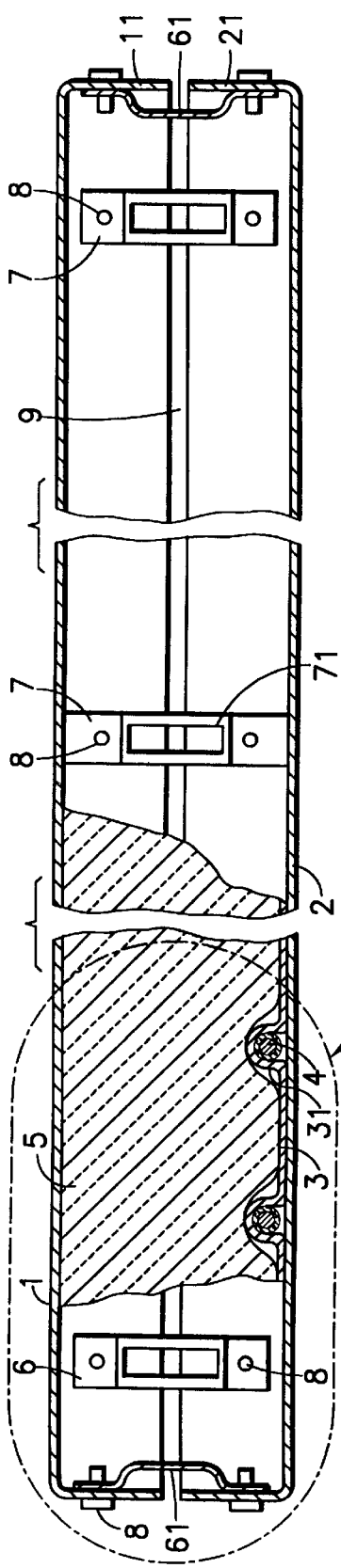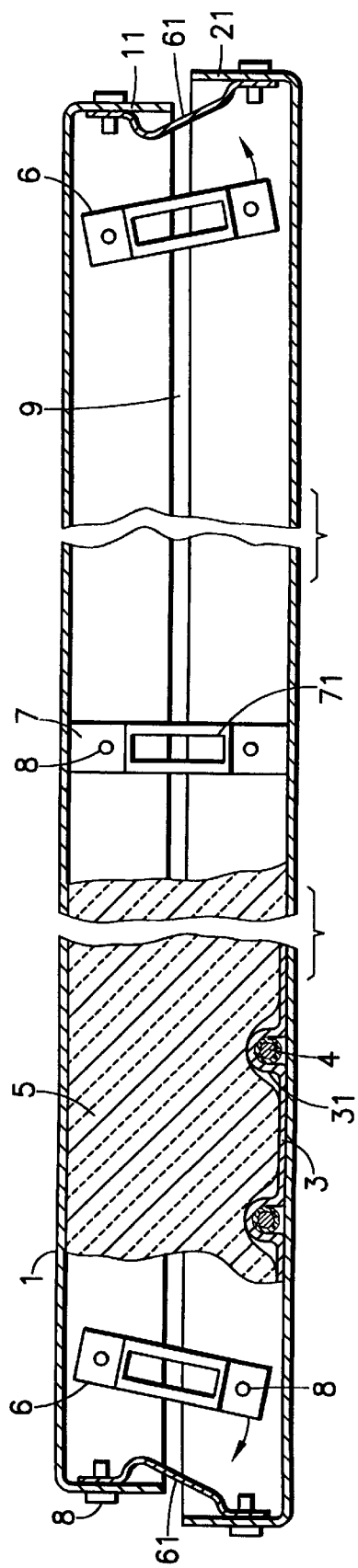

CEILING MOUNTED ELECTRICAL HEATER WITH FLEXIBLE MOUNTING STRUCTURE

BACKGROUND OF THE INVENTION

The present invention relates to a heater based on a hot radiant plate which radiates heat, and comprising a heating element which produces and distributes heat across the radiant plate, a thermal insulation layer which also supports the radiant plate and ensures good heat contact between the heating element and the radiant plate, a cold plate where the electrical and mechanical fastening means are mounted, and fastening means between the hot plate and the cold plate which, with minimal heat contact, ensure free horizontal movement between the two plates while keeping them locked together about a center point.

A radiant panel heater is in principle based on heating a plate to a desired temperature so that heat waves are emitted to the surroundings as direct radiation from the plate. As a rule it is desirable to direct the heat waves in particular directions, for example downward from a ceiling heater, this being achieved by thermal insulation in other directions or by shielding against radiation in those directions where it is unwanted.

Electric radiant heaters for ceilings are previously known, comprising a relatively elongate radiant heating element consisting of an extruded aluminum profile which is heated to about 300° C. The radiant heat profile is mounted in a steel box and insulation is placed on the top side so that there is a significant temperature difference between the radiating plate and the surface of the radiant element facing other directions.

Because of the various types of requirements set for such electric radiant heaters for ceilings, the design thereof involves considerable difficulties, inter alia, caused by uneven thermal expansion of the materials contained in the structure, an expansion which may lead to undesirable sounds, torsion and deformations. Furthermore, in the previously known examples there is considerable heat contact and thereby heat transfer to those parts of the heater which shall not emit radiant heat, this heat thus being unavailable for heating those areas which are meant to be heated. It is only the radiant heat energy emitted in the desired direction that can be regarded as effective energy; all other radiated energy is to be considered a heat loss.

A ceiling heater is always highly visible in a room and should therefore be as discreet in its design and selection of materials as possible so as not to become a disturbing element in the ceiling, this being particularly important in buildings such as churches, for example. It may often be desirable to design the ceiling heater as a part of the ceiling, a task rendered difficult with the existing structures which are fixedly locked to one or more aluminum profiles positioned side by side in a steel box.

For space heating it is generally these types of heaters that are used:

Wall radiators, the main purpose of which is to heat the air in the room. These are well suited to low-ceilinged rooms used for extended periods of time. This type of heating is not suited to high-ceilinged rooms because a great deal of air circulation will occur in the room, at the same time as the hot air will accumulate on top, next to the ceiling.

Ceiling heat and floor heat, both of which are a low-temperature radiant heat having a surface temperature 5°–25° C. above the air temperature. Here the purpose is to give a low temperature radiant heat to the whole room from the heating elements built into the ceiling or floor. The weakness of the system is that it has a great deal of thermo-technical inertia, and that it does not concentrate the heat in those areas of the room where it is wanted. The effect delivered is about 150 watt/$m^2$.

Reflector heaters, which have incandescent heating elements of 600°–800° C. These are heaters which have high heat output in relation to size. They emit a short-wave heat radiation which after an extended period of time may often feel uncomfortable. The reflector is easily soiled, preventing the heat waves from being reflected down into the room and resulting in the heater changing character by approaching a convector heater, the heat thereby remaining on top right next to the ceiling.

Medium-temperature radiant panel heaters, which may be ceiling heater cassettes, either free-hanging or built into dropped ceiling systems, and having a radiant plate temperature in the range of 50°–100° C. above air temperature. For higher temperatures (up to 330° C.) the radiant plate is commonly an extruded aluminum profile having the heating element positioned in a track in the aluminum profile which is mounted in an outer housing, so that the heat expansion in the longitudinal direction can occur as unobstructed as possible (Norwegian Patent Application No. 873830). These heaters have little thermo-technical inertia, function equally well if they become soiled, and are particularly well suited to high-ceilinged rooms which have poor thermal insulation in the walls and are not in continuous use. They provide a comfortable long-wave radiant heat which can be concentrated over those areas in the room where heating is desired, and they do not produce much air circulation in the room. These are heaters yielding an effect of 500–5000 watt/$^2$.

SUMMARY OF THE INVENTION

The present invention describes a principle whereby both the top part and the radiant plate are made of plate-shaped material, have approximately the same shape and size, have unity of design for all heaters irrespective of the temperature of the radiant plate, and it thus covers all types and sizes of medium temperature radiant panel heaters for ceilings.

A radiant panel heater consists in principle of a hot plate emitting radiant heat, a heating element supplying the hot plate with an even heat across the entire surface, a heat insulation which prevents the heat from spreading to the cold plate which frames the heater and to which the ceiling fastening brackets and the electrical coupling box are attached.

The main problems in making such a heater are as follows: to make a hot plate having as even a temperature as possible across the whole plate, because it is that point on the plate which has the highest temperature which determines how much radiant heat it is possible to obtain from a given surface, due attention being paid to the maximum temperature sustainable by the radiant plate. This is of great importance for production costs.

If the hot plate has an uneven temperature, it will also produce uneven thermal expansion, leading to the possible deformation or twisting of the hot plate and the results this will have on appearance and, in particular, on the heat contact between the heating element and the radiant plate. This problem increases with the increase in temperature of the radiant plate, particularly because the rigidity of the material in the radiant plate is then often greatly reduced.

During the heating the entire hot plate will expand in all directions, and this expansion must be allowed to proceed without hindrance.

The heating element must conduct heat well in the horizontal direction, have good heat contact with the radiant plate and in conjunction therewith provide an even temperature across the entire radiant surface. The expansion of the heating element is often different from that of the radiant plate, so that the heating element must be capable of moving freely in relation to the radiant plate at the same time as it is pressed down against it.

The insulation shall primarily provide a desired thermal insulation between the hot part of the heater and the cold part thereof, but it shall also support the radiant plate against mechanical stress, and press the heating element against the radiant plate.

The different parts of the heater must be connected in such a manner that there is as little heat contact as possible between the hot plate and the cold plate without free horizontal movement being prevented.

In order to be competitive in the market such a heater structure must be practical and inexpensive in production and be capable of being made in different sizes and shapes adapted to particular purposes. It should be capable of being made in a unified and discreet design, having a surface which in character and color can be adapted to the rest of the ceiling. In terms of production technique, it is an advantage that all heaters are produced on the same principle, so that many of the same technical solutions and components can be used in all types and sizes of heaters.

On the basis of the above, there are, according to the invention, provided solutions which are further disclosed in the patent claims.

In the following, the invention shall be explained in more details, with reference to the drawings,

BRIEF DESCRIPTION OF THE DRAWINGS

FIG. 3 is a section of a radiant panel heater parallel to lines A—A and B—B where the radiant plate 2 is in a cold condition.

FIG. 4 is a section of a radiant panel heater parallel to lines A—A and B—B, where the radiant plate is in a hot condition and have thereby expanded in all directions from the center of the heater.

DETAILED DESCRIPTION OF THE INVENTION

In the following it will be described how the invention makes it possible to produce a heater having the properties described in the stated objectives.

Figure 1:
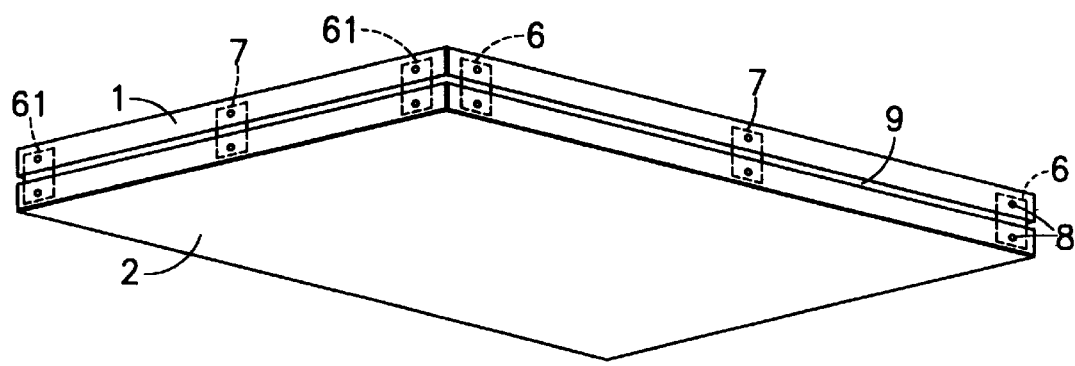
FIG. 1 is a perspective view of a radiant panel heater having a top part 1, a radiant plate 2, resilient and rotatable brackets 6, resilient and non-rotatable brackets 7, and a spacing (9) between the cold top part and the hot radiant plate.

FIG. 1 shows a radiant panel heater, consisting of a cold top part 1, which contains fastening means for being mounted to the ceiling or wall, has space for electrical connections, is mechanically stable and provides the prefinished heater with sufficient strength to withstand the external and internal stresses to which it will be exposed, and a bottom radiant plate 2, which is separated from the top part 1 by a spacing 9, which may have a width of 2–8 mm depending upon the temperature difference between the two plates. This spacing minimizes the heat transfer between the hot part and the cold part of the heater.

Furthermore, FIG. 1 shows how the two parts are fastened together by fastening brackets 6 at all points of extremity, by fastening brackets 7 in the middle of each side and by screws 8 which fasten the fastening brackets to the top part 1 and the radiant plate 2, respectively.

Figure 2:
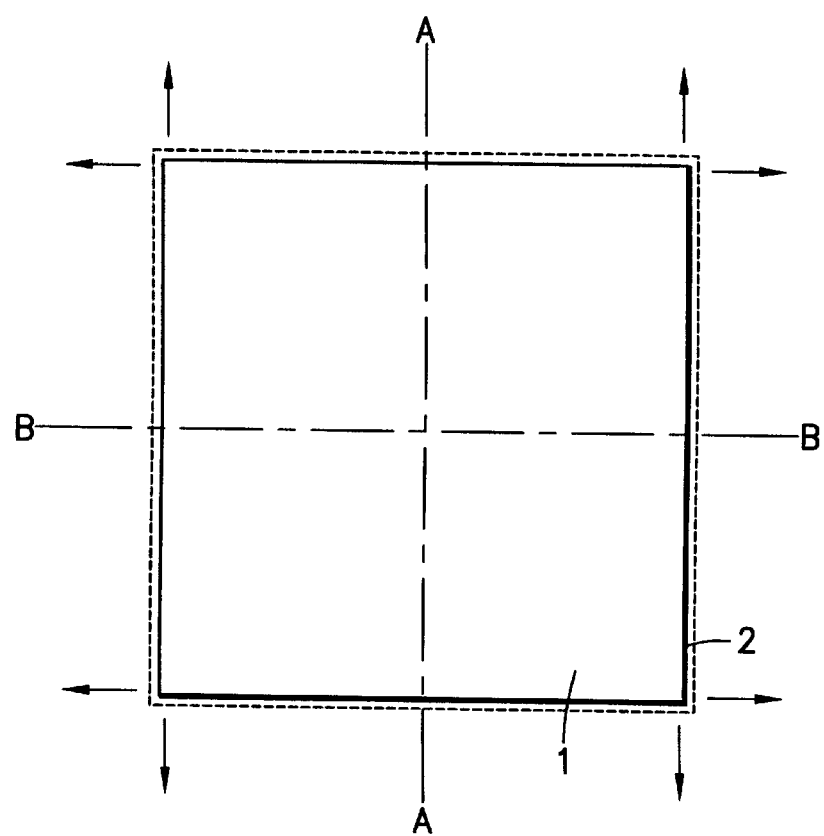
FIG. 2 is a top view of the radiant panel heater, having the top part 1, drawn with a solid line, and the radiant plate 2 in a hot condition, drawn with a dotted line, and having arrows showing that the radiant plate 2, which in a cold condition has the same size as the top part 1, in a hot condition has expanded in all directions from a center point between lines A—A and B—B.

FIG. 2 shows, from above, a radiant panel heater where the top part and the radiant plate in a cold condition have been drawn with a solid line, and where the radiant plate in a hot conditions has been drawn with a dotted line. The arrows show how the hot radiant plate has expanded in all directions, thereby revealing the necessity of having the fastenings between the cold top part 1 and the hot radiant plate 2 capable of accommodating this extension in length in such a manner that the finished heater does not create noise, become deformed or become damaged in other ways.

FIG. 3 shows a section of the heater parallel to A—A or B—B in FIG. 2, where the radiant plate is in a cold condition. FIG. 4 shows the same section, but with the radiant plate in a hot condition.

The top part 1 is preferably made of a plate-shaped material of high rigidity, the surface treatment of which has the lowest possible emission coefficient, and which, in conjunction with this plate having optimal thermal insulation against the hot radiant plate, radiates as little heat as possible.

The radiant plate 2 has approximately the same size and shape as the top part 1 and is preferably made of a plate-shaped material which has high rigidity at those temperatures to which the plate is exposed, which has a surface treatment providing the highest possible emission coefficient, and which, in conjunction with this plate having optimal thermal insulation against the cold plate 1, radiates as much heat as possible.

Both the top part 1 and the radiant plate 2 have an upturned flange 11 and 21 around, preferably, all side edges, which serves as reinforcement and also as attachement base for the fastening brackets 6 and 7 which keep the two parts together. The lateral flanges may either be of equal height, so that the spacing 9 is in the middle of the side edge, or different, so that the spacing is closer to the radiant plate or to the top part. Furthermore, the spacing may be of different width depending upon the temperature difference between the top part and the radiant plate or upon possible design requirements.

The top part 1 and the radiant plate 2 are attached to each other by means of fastening brackets 6 at all corners or at a plurality of positions along the sides if the heater is elongate and such placement is necessary to prevent deformation of the heater because of the heat expansion of the radiant plate.

The heat expansion is accommodated by the fastening brackets 6 in that they in one plane can rotate about the fastening screw 8 and that they at right angles to the rotating plane are resilient in the middle section of the fastening bracket 61, and 71 as apparent from FIGS. 3 and 4. The radiant plate 2 achieves thereby unobstructed thermal expansion in all directions in the horizontal plane, but is locked in the vertical plane and is therefore incapable of twisting.

In order to ensure that the thermal expansion is equal on both sides of the heater and the radiant plate 2 will return to its original position in relation to the top part 1, the fastening brackets 7, which keep the top part 1 and the radiant plate 2 together in the middle of all long sides, are fastened to the top part 1 in such a manner that they are resilient but not rotatable about the fastening screw 8, either in that the fastening bracket 7 is of such a length that it is locked against the top part, that it possibly has two fastening screws on one side or that it is glued to the top part 1. The thermal expansion will in this manner be locked about the central axes A—A and B—B in FIG. 2. The fastening brackets 6 and 7 are made of a poor heat conducting material.

Figure 3A:
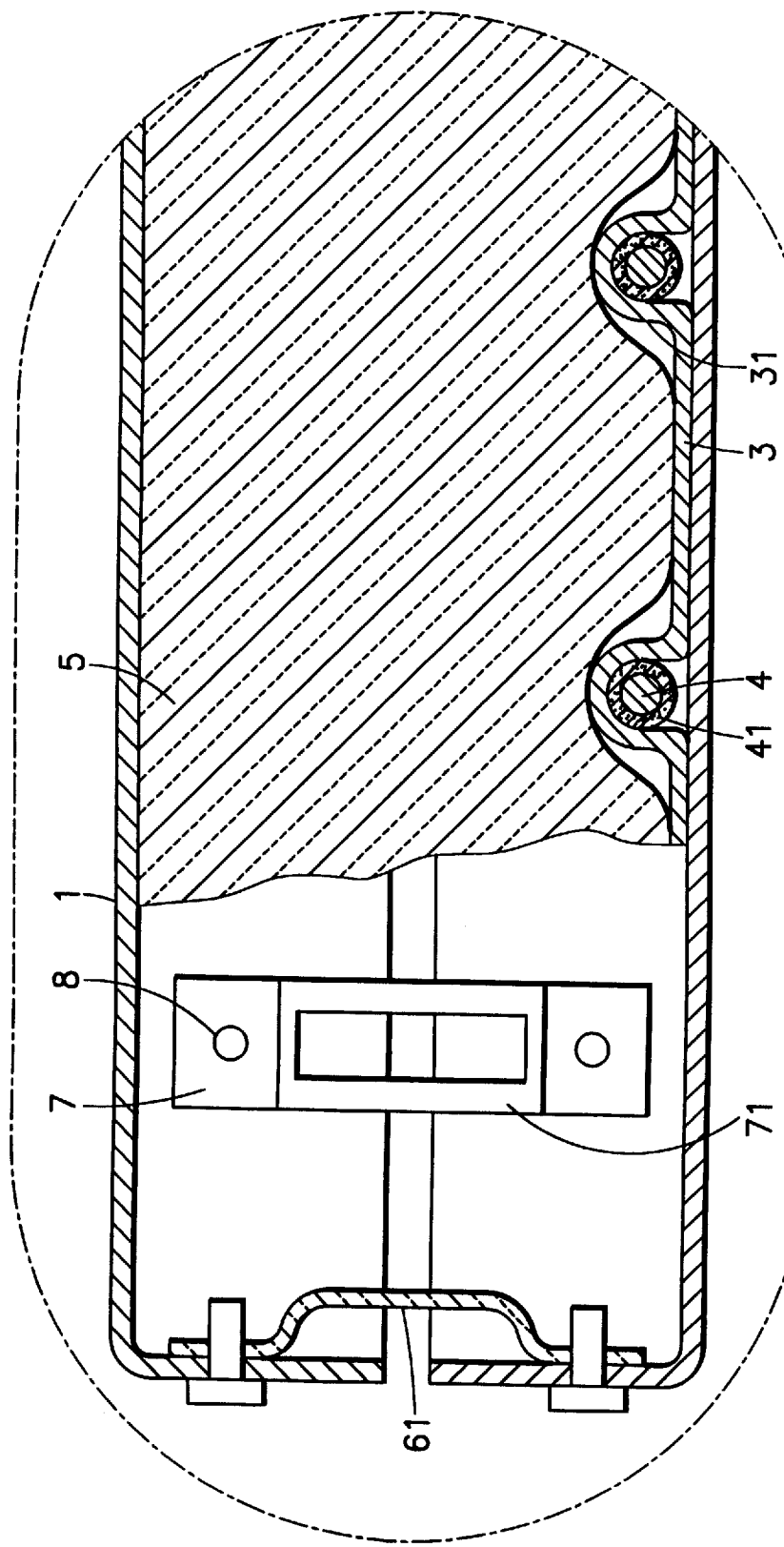
FIG. 3A is an enlarged section of the radiant panel heater of FIG. 3.

A plate heating unit 3 having a heating element 4 is in direct contact with the radiant plate 2. The plate heating element 3 is made of tempered pure aluminum, which conducts heat better and is more easily shaped that alloy aluminum. The plate heating unit is heated by the heating element 4 which for low temperatures may be silicon insulated heating cable with silicon insulation 41, as shown in FIG. 3A, and for higher temperatures tube elements or bead insulated heating coils, and which is arranged in a sinuous fashion at a desired distance from the center and attached to the plate heating unit by lugs 31. By varying the center distance and thickness of the material in the plate heating unit and thereby the ability to conduct heat in the horizontal direction, the desired heat distribution can be obtained.

The plate heating unit 3 lies flatly and loosely against the radiant plate 2, is capable of moving freely in all directions in the horizontal plane, and is pressed down toward the radiant plate 2 by the thermal insulation 5. The thermal insulation 5, which preferably is of rigid ceramic fibers, covers the entire space between the top part 1 and the plate heating unit 3, prevents the heat from the plate heating unit 3 to be transmitted to the top part 1, presses the plate heating element 3 down toward the radiant plate 2 and provides a mechanical support of the radiant plate 2 at the same time as the whole structure becomes mechanically stable.

What is claimed is:

1. An electric ceiling heater, comprising:
   a radiant plate which extends in a first horizontal plane and has heating elements associated therewith;
   the radiant plate being adapted to radiate heat in a downward direction;
   a top part extending in a second horizontal plane;
   the radiant plate being positioned below the top part and being supported by the top part via a plurality of brackets;
   the brackets extending downwardly from the top part to the radiant plate;
   each of the brackets having a respective first mounting point for being mounted to the top part, and a respective second mounting point for being mounted to the radiant plate; wherein:
   the brackets are adapted to flex to allow the radiant plate to move laterally outward relative to the top part in the first horizontal plane when the radiant plate is heated;
   the respective first mounting points of the brackets are mounted to at least two opposing peripheral sides of the top part;
   the respective second mounting points of the brackets are mounted to at least two peripheral sides of the radiant plate corresponding to said at least two opposing peripheral sides of the top part;
   at least some of the brackets are non-pivotable about their respective first mounting points;
   at least some of the brackets are pivotable about their respective first mounting points;
   the pivotable brackets are mounted near respective corners of the top part and the radiant plate; and
   the non-pivotable brackets are mounted near respective midpoints of the at least two opposing peripheral sides of the top part and the radiant plate.

2. The heater of claim 1, wherein:
   the top part and the radiant plate are elongated with respective opposing long sides; and
   the non-pivotable brackets are mounted near the respective midpoints of the long sides of the top part and the radiant plate.

3. The heater of claim 2, wherein:
   the pivotable brackets are adapted to pivot in opposing directions along the long sides to accommodate laterally outward movement of the radiant plate relative to the top part in the opposing directions when the radiant plate is heated.

4. The heater of claim 1, wherein:
   the pivotable brackets are adapted to pivot in opposing directions along a common one of the peripheral sides to accommodate laterally outward movement of the radiant plate relative to the top part in the opposing directions when the radiant plate is heated.

5. The heater of claim 1, wherein:
   the brackets are of a poor heat conducting material; and
   each bracket has a hole in a middle section thereof.

6. The heater of claim 1, wherein:
   the brackets include respective middle sections extending between the respective first and second mounting points; and
   the respective middle portions are bent inwardly toward an interior portion of the heater so that the respective middle sections do not prevent the radiant plate from moving.

7. The heater of claim 1, wherein:
   the top part is spaced apart from the radiant plate by about 2 mm to 8 mm.

* * * * *